United States Patent Office 3,719,523
Patented Mar. 6, 1973

3,719,523
HYDROXY-VINYL COPOLYMER AND GRADED-RUBBER PAINT AND PROCESS
Olin B. Johnson, Livonia, and Santokh S. Labana, Dearborn Heights, Mich., assignors to Ford Motor Company, Dearborn, Mich.
No Drawing. Filed Dec. 21, 1970, Ser. No. 100,541
Int. Cl. C08f 15/00, 19/00
U.S. Cl. 117—93.31                                    17 Claims

ABSTRACT OF THE DISCLOSURE

A radiation-curable paint which on a pigment and particulate filler-free basis consists essentially of vinyl monomers and a unique, alpha-beta olefinically unsaturated, rubber-comprising resin formed by reacting a monohydroxy copolymer containing carboxy functionality with a carboxy (acyl chloride)-functional, graded-rubber particle and reacting the resultant polymeric product with an epoxyacrylate monomer. The dispersion is applied to substrates as a paint film and cured thereon by exposure to ionizing radiation, e.g. an electron beam.

THE INVENTION

A unique, rubber-comprising, radiation-curable paint is provided by preparing a film-forming dispersion of vinyl monomers and an alpha-beta olefinically unsaturated, rubber-comprising resin formed by reacting a monohydroxy copolymer of vinyl monomers at least one of which is an alpha-beta olefinically unsaturated monocarboxylic acid with a carboxy (acyl chloride)-functional, graded-rubber particle and reacting the resultant polymeric product with an epoxyacrylate monomer, e.g. glycidyl methacrylate, to introduce alpha-beta olefinic unsaturation. The dispersion is applied to substrates, e.g., wood, glass, shaped polymeric solids, etc., as a paint film and cured thereon by ionizing radiation, preferably an electron beam having average energy in the range of about 100,000 to about 500,000 electron volts.

(I) The monohydroxy copolymer

The alpha-beta olefinically unsaturated, monohydroxy, copolymer of vinyl monomers used in the preparation of the polymeric component of these paints advantageously has average molecular weight in the range of about 1,000 to about 8,000, preferably between about 1,500 and about 5,000. These copolymers consist essentially of carbon, hydrogen and oxygen. The preferred constituent monomers are esters of acrylic or methacrylic acid and a $C_1$–$C_8$ monohydric alcohol, one hydroxyalkyl acrylate, and monomers for introducing carboxy functionality, e.g., acrylic acid or methacrylic acid. Other vinyl monomers, preferably in minor proportions, can also be used.

The monohydroxy vinyl copolymer can be prepared by conventional methods for preparing vinyl monomer-comprising copolymers employing a free-radical initiator, e.g. benzoyl peroxide, dibutyl peroxide, 2,2'-azobis-(2-methylpropionitrile), hereinafter termed AIBN, etc., and a chain transfer agent for limiting molecular weight, e.g. dodecane thiol, benzene thiol, pentene thiol, butane thiol, etc. The concentration of initiator in the charge is advantageously about 3–4 weight percent. The concentration of chain transfer agent in the charge is advantageously about 2–3 weight percent. To provide the hydroxy functionality, one of the constituent monomers will be a hydroxyalkyl acrylate, e.g. hydroxyethyl acrylate, hydroxyethyl methacrylate, hydroxypropyl acrylate, hydroxypropyl methacrylate, etc. The concentration of this component will vary from about 3 mole percent in the case of the higher molecular weights to about 7 mole percent in the case of the lower molecular weights. At least one of the constituent monomers can be acrylic or methacrylic acid to provide the copolymer with carboxy functionality. The acid group can later be reacted with an epoxy-functional acrylate or methacrylate, e.g. glycidyl methacrylate, to provide the desired alpha-beta olefinic unsaturation. The concentration of this reactant will be controlled to obtain an average of 0.7 to 0.9 unit of unsaturation per polymer chain.

Under these conditions using these materials, a minor amount of the copolymer will be produced having two hydroxyl groups per molecule as well as a minor amount of copolymer having no free hydroxyl groups. The production of these materials is minimized by the use of the chain transfer agent and liberal use of initiator above described, by the proper proportioning of constituent monomers above described, and by intimate mixing of reactants during copolymer formation. A reaction product containing less than about 30 mole percent of the dihydroxy copolymer and less than about 15 mole percent of copolymer without hydroxyl is suitable for use in this invention. Preferably, the monohydroxy terminated copolymer comprises in excess of 88 mole percent of the reaction product. Hydroxyl number can be determined by the well known method of analysis wherein the hydroxy groups are reacted with acetic anhydride using a pyridine catalyst. The acetic acid produced is then back titrated with sodium hydroxide. For details, see Steyermark, Quantitative Organic Analysis, pp. 302–303, published by Blakiston Company, New York, Toronto and Philadelphia (1951).

(II) The graded-rubber particles

The graded-rubber particle has a core of crosslinked, elastomeric, acrylic polymer, an outer shell comprising methacrylate and a copolymerizable monomer which leaves unreacted a carboxyl group or a copolymerizable monomer which can be subsequently reacted with a second monomer which provides the resultant material with a free carboxyl group, and an intermediate layer which is a copolymer of the monomers used to form the core and the monomers used to form the outer shell.

The process for preparing these particulate materials is at least a two-stage process. In one method of preparation, a major amount of monofunctional monoacrylate is emulsion copolymerized in the first stage with a crosslinking amount of a di- or tri-functional monomer containing two or more non-conjugated terminal ethylenic groups, preferably a diacrylate, using a water-soluble free radical initiator and a suitable surfactant to yield a water-soluble free radical initiator and a suitable surfactant to yield a latex of relatively uniform particle size, e.g., 0.04 to 1 micron average diameter. Before this reaction reaches substantial completion, i.e., when the reaction is between about 50 and about 90, preferably between about 70 and about 89, percent complete, the second monomeric component, i.e., a mixture of about 80 to about 98, preferably about 85 to about 95, mole percent methyl methacrylate, and about 2 to about 20, preferably about 5 to about 15, mole percent of an alpha-beta olefinically unsaturated monocarboxylic acid, e.g., acrylic acid, methacrylic acid, etc., or a mixture of about 2 to about 20, preferably about 5 to about 15, mole percent of a carboxy-functional acrylic monomer and about 80 to about 98 mole percent of a monomer mixture selected from and consisting essentially of esters of acrylic or methacrylic acid and a $C_1$–$C_8$ monohydric alcohol, monovinyl hydrocarbons, diacrylates and divinyl hydrocarbons, is added slowly to the reaction mixture. The content of methyl methacrylate in the last described mixture is at least 30 mole percent. The polymerization process is continued to yield a stable latex of relatively uniform particle size and composition. A surfactant is used in forming the emulsion and additional surfactant may be added simultaneously with the second stage monomeric component.

The latex is coagulated, washed and dried to yield a finely divided white powder suitable for use in this invention. Generally, the particles are prepared from monomers that will provide a crosslinked acrylic, rubber-like core and a glass-like polymeric outer shell at room temperature, e.g., 20°–30° C. The terms "rubber-like" and "glass-like" are, of course, meaningless except when used in reference to a specific temperature or temperature range. The particles should be formulated so that the core retains its rubber-like properties and the outer shell retains its glass-like properties at temperatures encountered by articles of commerce in the intended field of use. Hence, for practical purposes, the monomers should be selected so that the core has a glass transition temperature that is substantially below that of the outer shell. Advantageously, the difference in glass transition temperature between the core and the shell is at least 50° C., preferably about 100° C.

The core is formed from a major amount of an alkyl, monofunctional, monoacrylate and a crosslinking amount of a di- or tri-functional monomer containing 2 or more non-conjugated terminal ethylenic groups. The monofunctional, alkyl monoacrylate is preferably an ester of a $C_2$–$C_8$ monohydric alcohol and acrylic acid, e.g., ethyl acrylate, butyl acrylate, hexyl acrylate, 2-ethyl hexyl acrylate and/or mixtures of the same. Certain other alkyl acrylates may be used when the crosslinked polymer thereof has an appropriate glass transition temperature, e.g., dodecyl methacrylate. Butyl acrylate and 2-ethyl hexyl acrylate are the most preferred of the monoacrylates for use in forming the core. The polymers produced from most methacrylates have glass transition temperatures which are too high to provide rubber-like properties at normally encountered temperatures. Hence, except for special use applications, the monoacrylate component of the core will be either an ester (or esters) of acrylic acid or a mixture of a major amount of the same and a minor amount of methacrylate.

Suitable crosslinking agents include, but not by way of limitation, 1,3-butylene diacrylate, 1,3-butylene dimethacrylate, divinyl benzene, 1,6-hexamethylene diacrylate, 1,6-hexamethylene dimethacrylate, 1,1,1-trimethylolethane triacrylate 1,1,1-trimethylolpropane triacrylate, 1,1,1-trimethacrylate, 1,4 - dimethylolcyclohexane dimethacrylate, allyl acrylate, allyl methacrylate, methallyl acrylate, methallyl methacrylate, diallyl maleate, diallyl fumarate, and diallyl phthalate. In one embodiment, the crosslinking agent is a diester of acrylic or methacrylic acid and a $C_2$–$C_8$, preferably $C_2$–$C_6$, dihydric alcohol. In another embodiment, the cross-linking agent is a triester of acrylic or methacrylic acid and a $C_2$–$C_8$, preferably $C_2$–$C_6$, trihydric alcohol.

In the first reaction stage, there is preferably employed about 80 to about 98 mole percent of a monofunctional, monoacrylate and about 20 to about 2 mole percent of the cross-linking agent.

In the second stage reaction, it is preferred to use a mixture of about 80 to about 98, preferably about 85 to about 95 mole percent methyl methacrylate and about 2 to about 20, preferably about 5 to about 15, mole percent of acrylic or methacrylic acid. These are added before the first reaction ceases. The amounts of the second stage reactants relative to the combined first stage reactants may vary widely depending upon the physical properties desired in the final product, i.e., from about 10 to about 90 to about 90 to about 10 weight percent.

The methyl methacrylate concentration in the outer shell is advisedly at least about 30 mole percent with the balance of the monofunctional component being made up of mono-functional monoacrylates, e.g., esters of $C_2$–$C_8$ monohydric alcohols and either acrylic or methacrylic acid, or monofunctional vinyl hydrocarbons such as styrene, methyl substituted styrenes, e.g., alpha methyl styrene, vinyl toluene, etc. It will also be advantageous at times to have a limited amount of crosslinking in the outer shell and hence to include in said "balance" a minor amount of diacrylate, e.g., 1 to 30 mole percent of a diester of acrylic or methacrylic acid and a $C_2$–$C_8$, preferably $C_2$–$C_6$, dihydricalcohol, or divinylhydrocarbon, e.g., 1 to 30 mole percent of divinyl benzene. The physical properties of the outer shell may also be modified by replacing up to about 30 mole percent of the methyl methacrylate with acrylonitrile, methacrylonitrile, or vinyl acetate.

The initial monomer charge is usually emulsified by one or more micelle-forming compounds composed of a hydrophobic part, such as a hydrocarbon group containing 8 or more carbon atoms, and a hydrophilic part, such as alkaline metal or ammonium carboxylate groups, phosphate or sulfate partial ester groups, sulfonate groups, and the like. Exemplary emulsifying agents include alkali metal sulfonates of styrene, naphthalene, decyl benzene and dodecyl benzene; sodium dodecyl sulfate; sodium stearate; sodium oleate; sodium alkyl aryl sulfonates; polyoxyethylene sulfates and phosphates; the ethylene oxide condensates with long chain fatty acids, alcohols, and mercaptans and the alkali metal salts of rosin acids. These materials and techniques of employment of emulsion formation and maintenance are well known to the art and have no unusual application here. As they are conventional materials employed in a conventional manner further description is unnecessary.

The polymerization initiator is composed of one or more water-soluble, free-radical-generating species such as hydrogen peroxide or sodium, potassium, or ammonium persulfates, perborates, peracetates, percarbonates and the like. As is well known in the art, these initiators may be associated with activating systems such as redox systems which may incorporate mild reducing agents such as sulfites and thiosulfites and redox reaction promotors such as transition metal ions.

A chain transfer agent or a mixture of chain transfer agents may be added to the reaction medium to limit the molecular weight of the polymer. Such chain transfer agents are generally mercaptans such as dodecane thiol, pentane thiol, and butane thiol.

Those skilled in the art will be aware that other emulsifying agents, polymerization initiators and chain transfer agents may be used when compatible with the polymerization system herein employed.

The reaction may be carried out at temperatures from about 40° C. to about 80° C., or at lower temperatures, as from 0° C. to 80° C. in the case of activated systems.

The graded-rubber particles above described and this method of preparation are disclosed by Ray A. Dickie and Seymour Newman in their patent application Ser. No. 100,464 filed of even date with this application.

In another method of preparation, hereinafter illustrated, the rubber particles are formed in an aliphatic hydrocarbon medium.

(III) Reaction of hydroxy polymer with carboxy rubber

The carboxyl groups on the graded-rubber particles can be converted to the corresponding carboxy chloride in the following manner: One part of the rubber particles are swollen by addition of one part by weight of benzene and then dispersed in 10 parts by weight of isooctane. Thionyl chloride in an amount sufficient to convert at least 80 percent of the carboxyl groups on the rubber is then added gradually. The contents are maintained at 80° C. for 4 hours. Acidic gases are then removed by flow of nitrogen through the reaction mixture.

Monohydroxy vinyl copolymer in an amount to provide one hydroxyl group for each carboxyl group on the original carboxy rubber is then added with 0.02 part of pyridine. The contents are maintained at 80° C. for about 4 hours.

(IV) Reaction of remaining carboxyl groups with an epoxy acrylate

The carboxyl groups originally present in the hydroxy polymer and the carboxy groups left unreacted on the graded-rubber particles are then reacted with an epoxy or glycidyl acrylate monomer. The glycidyl or epoxy acrylate monomer such as glycidyl methacrylate or 2,3-epoxyethyl acrylate is used in an amount to provide 0.70 to 0.99 mole of epoxy groups for each mole of carboxy groups is added to the reaction mixture. Hydroquinone 0.1 part by weight is also added. The contents are maintained at 80° C. for 4 hours. The isooctane and benzene are then removed under reduced pressure and the resultant mass dispersed in 20 to 80 parts of acrylic monomers.

(V) Vinyl monomers employed in the paint dispersion

The pain binder dispersion advantageously contains about 20 to about 80, preferably about 25 to about 75, weight percent vinyl monomers and about 20 to about 80, preferably about 25 to about 75, weight percent of the polymeric component, i.e., the alpha-beta olefinically unsaturated, rubber-comprising resin formed by reacting the alpha-beta olefinically unsaturated, monohydroxy, copolymer of vinyl monomers and the carboxy-functional, graded-rubber particle. Obviously, the polymeric component may also contain other alpha-beta olefinically unsaturated resins such as those disclosed in U.S. Patents 3,437,512; 3,437,513; 3,437,514 and 3,509,234.

Monomer type and concentration provide one means for adjusting the viscosity of the paint dispersion to conform to the methods of application desired, e.g., spray coating, roll coating, etc. In functional terms, the amount of vinyl monomer present is at least sufficient to convert the alpha-beta olefinically unsaturated, rubber-comprising resin into a cross-linked continuous coating on the surface of a substrate when a film of such coating dispersion is exposed to ionizing radiation, e.g., electron beam.

Vinyl monomers employed may be monofunctional, monoacrylates formed by the esterification of acrylic or methacrylic acid and a $C_1$-$C_8$, preferably a $C_1$-$C_6$, monohydric alcohol, e.g., methyl methacrylate, ethyl acrylate, butyl acrylate, butyl butyl methacrylate, 2-ethyl hexyl acrylate, etc. The monomer mixture may also include a minor amount, e.g., 1 to 30 mole percent of diacrylates, e.g., the diesters of acrylic or methacrylic acid and a $C_2$-$C_6$ diol such as 1,3-butylene diacrylate, 1,3-butylene dimethacrylate, 1,6-hexamethylene diacrylate, 1,6-hexamethylene dimethacrylate, ethylene glycol dimethacrylate, etc.

Monovinyl hydrocarbons, e.g., styrene, alpha methyl styrene, vinyl toluene, etc., may also be used either alone or in combination with the aforementioned monoacrylates. Minor amounts, e.g., about 1 to about 30 mole percent of the vinyl monomer mixture may be made up of divinyl hydrocarbons such as divinyl benzene. Other vinyl monomers, e.g., acrylonitrile, methacrylonitrile, vinyl acetate, etc., may be employed in minor amounts, e.g., about 1 to about 30 mole percent.

Advantageously, at least 70 weight percent of the vinyl monomer component is made up of monoacrylates selected from esters of a $C_1$-$C_8$ monohydric alcohol and acrylic or methacrylic acid and/or monovinyl hydrocarbons having about 8 to about 9 carbon atoms. Frequently, it is advantageous to use a mixture of about 40 to about 60 mole percent of these monoacrylates and about 60 to about 40 mole percent of these monovinyl hydrocarbons.

(VI) Preparation and application of the coating dispersion to a substrate

By adjusting the viscosity of the coating dispersion to a viscosity compatible with the desired method of coating, these coatings may be applied by any of the conventional methods, e.g., brushing, spraying, roll coating, curtain coating, flow coating, etc.

The viscosity of the paint binder solution may be adjusted by varying the molecular weight of the alpha-beta olefinically unsaturated, rubber-comprising resin. This may be accomplished by controlling the average number of functional groups per graded-rubber particle by controlling the concentration of carboxyl bearing monomer in the outer shell, particularly in the final portion of the monomer mixture introduced into the reaction medium when the graded-rubber particle is produced. The viscosity may also be regulated by varying the relative concentration of the resin component with respect to the vinyl monomer component and/or by varying the relative concentrations of dissimilar monomers within the vinyl monomer component. The binder dispersion may be applied to the substrate essentially free of non-polymerizable, organic solvents and/or diluents or it may be applied with the solvent and/or diluents in a method of application wherein the solvents and/or diluents are flashed off prior to polymerization.

Coatings may be applied to any substrate, e.g., metal, wood, glass, polymeric solids, etc. These coatings will ordinarily be applied to an average depth in the range of about 0.1 to about 4 mils, more commonly about 0.5 to about 2 mils.

(VII) Curing the coatings

Films formed of the paints of this invention can be cured with ionizing radiation at relatively low temperatures, e.g., room temperature (20° to 25° C.) or a temperature between room temperature and that temperature at which significant vaporization of its most volatile component is initiated, ordinarily between 20° C. and 75° C. The radiation energy is applied at dose rates of about 0.1 to about 100 mrad per second on a workpiece, preferably a moving workpiece, with the coating receiving a total dose in the range of about 1 to about 25, commonly about 8 to about 15 mrad.

The term "ionizing radiation" as employed herein means radiation having sufficient energy to remove an electron from a gas atom, forming an ion, hence radiation with minimum energy of, or equivalent to, at least about 5,000 electron volts except when the curing is carried out in a vacuum. The preferred method of curing films of the instant paint binders on the substrates to which they have been applied is by subjecting such films to a beam of polymerization effecting electrons which at its source of emission is within the range of, or equivalent to, about 100,000 to about 500,000 electron volts. If irradiation is carried out in vacuum or at reduced pressure, this energy range may be considerably lower. In this method of curing, it is preferred to employ a minimum of about 25,000 volts per inch of distance between the radiation emitter and the workpiece where the intervening space is occupied by air or other gas of comparable density. Adjustment is made for the relative resistance of the intervening gas which is preferably an oxygen-free, inert gas such as nitrogen or helium.

In this application, the term "paint" is meant to include finely ground pigment and/or filler in the binder, the binder without pigment and/or filler or having very little of the same, which can be tinted, if desired. Thus, the binder, which is ultimately converted to a durable film resistant to wear, weather, etc. can be all or virtually all that is used to form the film or it can be a vehicle for pigmentary and/or mineral filler material.

The abbreviation "mrad" as employed herein means one million rad. The term "rad" as employed herein means that dose of radiation which results in the absorption of 100 ergs of energy per gram of absorber, i.e. coating film. The electron emitting means may be a linear electron accelerator capable of producing a direct current potential in the range hereinbefore mentioned. In such device, electrons are ordinarily emitted from a hot filament and accelerated through a uniform voltage gradient. The electron beam, which may be about ⅛ inch in diameter at this point, is then scanned in one direction to make a fan-shaped beam and then passed through a metal window, e.g., aluminum, aluminum-copper alloy, or magnesium-thorium alloy of about 0.003 inch thickness. This invention will be more fully understood from the following examples:

EXAMPLE 1

(A) Preparation of the graded-rubber particles

Graded-rubber particles are prepared in aqueous medium using the following procedure:

Materials:                                                Grams
(1) Deionized water _____ 375
(2) Surfactant [1] _____ 5.1
(3) Ethyl acrylate _____ 175
(4) 1,3-butylene dimethacrylate _____ 20
(5) Methacrylic acid _____ 5
(6) Ammonium persulfate (in 5 ml. of $H_2O$) __ 1
(7) Sodium formaldehyde sulfoxylate
    ($NaHSO_4 \cdot CH_2O \cdot 2H_2O$) (in 5 ml. of water) 0.7
(8) t-Butylhydroperoxide (70%) _____drops__ 5

[1] Anionic phosphate ester type.

In a reaction flask dissolve ¾ of surfactant in water and adjust pH to 90 by adding 50% sodium hydroxide solution. Add initiators (items 5, 6 and 7) and one half of the monomers and stir for 15 minutes with flow of nitrogen. The mix is heated to 45° C. Where the temperature then begins to rise by reaction isotherm, the addition of the other half of the monomers and the remainder of the surfactant. The temperature is maintained at 65° C. and the addition is completed in 45 minutes. The pH is adjusted to 9.0 by adding aqueous ammonia and the following materials are added to form the shell:

Materials:                                                Grams
Methyl methacrylate _____ 50
Methacrylic acid _____ 10
Surfactant [1] (in 2 ml. $H_2O$) _____ 0.2
Pentane thiol _____ 1.5
t-Butylhydroperoxide _____drops__ 3

[1] Same as used in formation of core.

The addition is completed in 30 minutes while maintaining the temperature at 65° C. The emulsion is then cooled and coagulated by adding 25 ml. of concentrated hydrochloric acid. The coagulate is washed with methanol and dried at 40° C. under vacuum.

(B) Preparation of monohydroxy vinyl copolymer

Materials:                                                Grams
2-hydroxyethyl methacrylate _____ 130
Methyl methacrylate _____ 2,784
Acrylic acid _____ 216
AIBN [1] _____ 80
Toluene _____ 3,000

[1] 2-azobis (2-methyl propionitrile).

Procedure: In a reaction flask fitted with condenser, nitrogen inlet, stirrer and dropping funnel is placed the toluene where it is heated to reflux. The mixture of the monomers and initiators is then added at a constant rate over a period of 4 hours. One gram of AIBN in 100 grams of toluene is then added over a period of 15 minutes and refluxing continued for one additional hour.

The polymer is isolated by evaporation of toluene or by coagulation in a large volume of hexane. The polymer has a number average molecular weight of about 3200 and contains an average of about one hydroxyl group per polymer molecule.

(C) Reaction of hydroxy polymer with carboxy rubber

One molar part of the carboxy rubber particles (one mole free carboxyl) are swollen by an equal weight of benzene and then dispersed in 10 times its weight of isooctane. Thionyl chloride in an amount sufficient to convert the carboxy groups on the rubber is then added gradually. The contents are maintained at 80° C. for 4 hours. Acidic gases are removed by flow of nitrogen through the reaction mixture.

Monohydroxy vinyl copolymer in an amount to provide about one hydroxyl group per one carboxy group on original carboxy rubber is then added. Add 0.02 part of pyridine and maintain the contents at 80° C. for 4 hours.

Isooctane and benzene are then removed under reduced pressure and the resultant mass dispersed in methyl methacrylate.

(D) Reaction of remaining carboxylic groups with glycidyl methacrylate

To the above dispersion is added 128 grams of glycidyl methacrylate in an amount to provide 0.9 mole of glycidyl groups for each mole of carboxyl groups on the dispersed rubber particles. Tetrabutyl ammonium bromide (24 grams) and hydroquinone (6 grams) are also added and the contents are heated at 65° C. for 4 hours.

(E) Coating of the substrates

This dispersion, which is now ready for pigmentation if desired, is adjusted by adjusting the methyl methacrylate concentration to provide a paint binder dispersion containing 50 weight percent methyl methacrylate and 50 weight percent of the alpha-beta olefinically unsaturated reaction product of the vinyl copolymer and the graded-rubber particles. This dispersion is applied to the substrate surfaces, i.e., wood, metal, glass, and shaped polymeric solid (acrylonitrile-butadienestyrene copolymer) to the average depth of about 0.7 mil (0.0007 inch) and cured by exposure to electron beam radiation. The conditions of irradiation are as follows:

Potential _____kv__ 275
Current _____ma__ 30
Distance, emitter to workpiece _____in__ 10
Dose _____mrad__ 10–15
Atmosphere _____ Nitrogen

EXAMPLE 2

The procedure of Example 1 is repeated with the difference that the constituent monomers, initiator and chain transfer agent used in preparing the copolymer are as listed below:

Grams
2-hydroxyethyl methacrylate _____ 130
Methyl methacrylate _____ 2748
Methacrylic acid _____ 252
Pentane thiol _____ 30
AIBN _____ 30

EXAMPLE 3

The procedure of Example 2 is repeated with the difference that the constituent monomers used in preparing the copolymer are as listed below:

Grams
Methyl methacrylate _____ 2748
2-hydroxyethyl acrylate _____ 116
Methacrylic acid _____ 252

EXAMPLE 4

The procedure of Example 2 is repeated with the difference that the constituent monomers used in preparing the copolymer are as listed below:

Grams
Ethyl acrylate _____ 3784
2-hydroxyethyl methacrylate _____ 116
Acrylic acid _____ 216

EXAMPLE 5

The procedure of Example 2 is repeated with the difference that the constituent monomers are used in preparing the copolymer are as listed below:

Grams
Ethyl methacrylate _____ 4784
2-hydroxyethyl methacrylate _____ 130
Acrylic acid _____ 216

EXAMPLE 6

The procedure of Example 2 is repeated with the difference that the constituent monomers are as listed below:

|  | Grams |
|---|---|
| Methyl methacrylate | 2748 |
| 2-hydroxypropyl acrylate | 116 |
| Methacrylic acid | 252 |

EXAMPLE 7

The procedure of Example 2 is repeated with the difference that the constituent monomers are as listed below:

|  | Grams |
|---|---|
| Methyl methacrylate | 2700 |
| 2-hydroxypropyl methacrylate | 116 |
| Acrylic acid | 300 |

EXAMPLE 8

The procedure of Example 1 is repeated with the difference that in the preparation of the core of the graded-rubber particles an equimolar amount of butyl acrylate is substituted for the ethyl acrylate.

EXAMPLE 9

The procedure of Example 1 is repeated with the difference that in the preparation of the core of the graded-rubber particles an equimolar amount of 2-ethyl hexyl acrylate is substituted for the ethyl acrylate.

EXAMPLE 10

The procedure of Example 1 is repeated with the difference that in the preparation of the core of the graded-rubber particles an equimolar amount of 1,3-butylene diacrylate is substituted for the 1,3-butylene dimethacrylate.

EXAMPLE 11

The procedure of Examples 1 and 2 are repeated with the difference that a vinyl monomer mixture consisting of 2 molar parts methyl methacrylate, 1 molar part ethyl acrylate and 1 molar part 2-ethyl hexyl acrylate is substituted for the methyl methacrylate component of the paint.

EXAMPLE 12

The procedures of Examples 1 and 2 are repeated with the difference that a vinyl monomer mixture consisting of 2 molar parts methyl methacrylate, 1 molar part methyl styrene and 1 molar part butyl acrylate is substituted for the methyl methacrylate component of the paint.

EXAMPLE 13

The procedures of Examples 1 and 2 are repeated with the difference that a vinyl monomer mixture consisting of 2 molar parts styrene, 1 molar part 1,3-butylene dimethacrylate, and 1 molar part methyl methacrylate is substituted for the methyl methacrylate component of the paint.

EXAMPLE 14

The procedures of Examples 1 and 2 are repeated with the difference that a vinyl monomer mixture consisting of 2 molar parts methyl methacrylate, 1 molar part styrene, and 1 molar part divinyl benzene is substituted for the methyl methacrylate component of the paint.

EXAMPLE 15

The procedures of Examples 1 and 2 are repeated except for the preparation of the carboxy-functional graded-rubber particles. The cores of the particles are here formed from about 85 mole percent butyl acrylate and about 15 mole percent divinyl benzene, and the outer shells are here formed from a monomer mixture consisting of 30 mole percent methyl methacrylate, 15 mole percent alpha methyl styrene, 10 mole percent ethyl acrylate, 10 mole percent acrylonitrile, 10 mole percent methacrylonitrile, 10 mole percent butyl methacrylate, 5 mole percent vinyl acetate and 10 mole percent methacrylic acid. The monomers used to form the outer shell excepting the methacrylic acid are divided into three portions. After the first two portions are slowly added to the reaction mixture, the final portion is mixed with the methacrylic acid and added dropwise to the reaction mixture over a 45 minute period.

EXAMPLE 16

The procedures of Examples 1 and 2 are repeated except for the preparation of the carboxy-functional graded-rubber particles. The outer shells are here formed from a mixture of about 95 mole percent methyl methacrylate and about 5 mole percent methacrylic acid. The monomers used to form the outer shell excepting the methacrylic acid are divided into four equal portions. After the first three portions have been slowly added, the final portion is mixed with the methacrylic acid and added dropwise to the reaction mixture over a 45 minute period.

EXAMPLE 17

The procedures of Examples 1 and 2 are repeated except for the preparation of the carboxy-functional graded-rubber particles. The cores of the particles are here formed from about 90 mole percent ethyl acrylate and about 10 mole percent of 1,1,1-trimethylolpropane trimethacrylate.

EXAMPLE 18

The procedures of Examples 1 and 2 are repeated except for the preparation of the carboxy-functional graded-rubber particles. The cores of the particles are here formed from about 90 mole percent 2-ethyl hexyl acrylate and about 10 mole percent of 1,4-dimethyolcyclohexane dimethacrylate.

EXAMPLE 19

The procedures of Examples 1 and 2 are repeated except for the preparation of the carboxy-functional graded-rubber particles. The cores of the particles are here formed from about 90 mole percent butyl acrylate and about 10 mole percent divinyl benzene.

EXAMPLE 20

The procedures of Examples 1 and 2 are repeated except for the difference that the curing of the coatings upon the substrates is carried out using an electron beam having an average potential of about 260,000 electron volts.

EXAMPLE 21

The procedures of Examples 1 and 2 are repeated except for the differences that the curing of the coatings upon the substrates is carried out using a helium atmosphere and an electron beam having an average potential of about 150,000 electron volts.

EXAMPLE 22

The procedures of Examples 1 and 2 are repeated except for the differences that the curing of the coating upon the substrates is carried out using an atmosphere comprising a major amount of nitrogen and a minor amount of carbon dioxide and an electron beam having an average potential of about 325,000 electron volts.

EXAMPLE 23

The procedures of Examples 1 and 2 are repeated with the differences that the coating dispersion consists essentially of about 80 parts by weight of the alpha-beta olefinically unsaturated reaction product of the monohydroxy vinyl copolymers and the carboxy-functional graded-rubber particles and about 20 parts by weight of an equimolar mixture of methyl methacrylate and styrene.

EXAMPLE 24

The procedures of Examples 1 and 2 are repeated with the difference that the coating dispersion consists essentially of about 20 parts by weight of the alpha-beta olefinically unsaturated reaction product of the monohydroxy vinyl copolymer and the carboxy-functional graded-rubber particles and about 80 parts by weight of vinyl monomers. The vinyl monomers are a mixture of 30 mole percent methyl methacrylate, 20 mole percent styrene, 20 mole percent ethyl acrylate, 10 mole percent acrylonitrile, 10 mole percent methacrylonitrile and 10 mole percent 1,3-butylene diacrylate.

EXAMPLE 25

The procedures of Examples 1 and 2 are repeated with the differences that the coating consists essentially of 50 parts by weight of the alpha-beta olefinically unsaturated reaction product of the monohydroxy vinyl copolymer and the carboxy-functional graded-rubber particles and about 50 parts by weight of vinyl monomers. The vinyl monomers are a mixture of 50 mole percent styrene, 30 mole percent methyl methacrylate, 20 mole percent butyl methacrylate and 10 mole percent 1,4-dimethylolcyclohexane dimethacrylate.

EXAMPLE 26

The procedures of Examples 1 and 2 are repeated with the differences that the coating dispersion consists essentially of 30 parts by weight of the alpha-beta olefinically unsaturated reaction product of the monohydroxy vinyl copolymer and the carboxy-functional graded-rubber particles and about 70 parts by weight of vinyl monomers. The vinyl monomers are a mixture of about 85 mole percent methyl methacrylate and about 15 mole percent divinyl benzene.

EXAMPLE 27

The procedure of Examples 1 and 2 are repeated with the difference that the carboxy-functional graded-rubber particles are prepared in the following manner:

(A) A mixture is formed from the following:

| Materials: | Grams |
|---|---|
| Ethyl acrylate | 80.0 |
| 1,3-butylene dimethacrylate | 20.0 |
| Dispersing agent [1] | 3.0 |
| AIBN [2] | 1.0 |

[1] An amphipatic copolymer (1 portion soluble in the acrylic monomers and the other portion soluble in the solvent, e.g., dodecane) is prepared by reacting 12-hydroxystearic acid (300 g.) in the presence of stearyl alcohol (310 g.) and p-toluene sulfonic acid (6 g.) at 180°–190° C. until the acid value is less than 1 mg. KOH/g. The product is then reacted with methacrylic anhydride (170 g.). The resulting material is then copolymerized with an equal amount of methyl methacrylate using AIBN initiator (9 g.) and butyl acetate solvent. This method of producing this dispersing agent is described in detail by K. E. J. Barratt and H. R. Thomas, Journal of Polymer Science, Part A-1, vol. 7, 2625 (1969). Other dispersing agents which are effective for stabilizing suspension in hydrocarbon liquids may be used in place of the above described material.
[2] 2,2'-azobis-(2-methyl propionitrile).

(B) The mixture of the above listed material is added to 1,000 grams n-dodecane under nitrogen. The mix is warmed to 40° C. When the exotherm starts the temperature is allowed to rise to 80° C. The temperature is maintained at 80° C. for 30 minutes.

(C) The reaction mixture is maintained in a nitrogen atmosphere and there is added slowly with stirring a mixture of the following materials:

| Materials: | Grams |
|---|---|
| Methyl methacrylate | 320.0 |
| Methacrylic acid | 42.0 |
| Dispersing agent [1] | 3.0 |
| AIBN | 6.0 |
| n-Dodecane | 1,000.0 |

[1] Same as in A.

EXAMPLE 28

The procedures of Examples 1 and 2 are repeated except for the difference that the vinyl copolymer and graded-rubber reaction product is formed from 0.25 molar part of the copolymer and 1 molar part of the carboxy-functional graded-rubber particles.

EXAMPLE 29

The procedures of Examples 1 and 2 are repeated except for the difference that the vinyl copolymer and graded-rubber reaction product is formed from 0.5 molar part of the vinyl copolymer and 1 molar part of the carboxy-functional graded-rubber particles.

The terms "acrylate" and "acrylates," when used herein without a modifier distinguishing between esters of acrylic and methacrylic acid, shall be understood to include both. This, of course, does not apply to a naming of a specific compound.

Carboxyl number and hydroxyl number can be determined by titration and molecular weight calculated using the methods described in "Preparative Method of Polymer Chemistry" by W. R. Sorenson and T. W. Campbell, Interscience Publishers, New York, N.Y., U.S.A. (1961) at page 134.

It will be understood by those skilled in the art that modifications can be made within the foregoing examples in the scope of this invention as hereinbefore described and hereinafter claimed.

We claim:

1. A radiation-curable paint which on a pigment and particulate filler-free basis comprises a film-forming dispersion of about 20 to about 80 weight percent of an alpha-beta olefinically unsaturated, rubber-comprising resin formed by esterifying 1 molar part of carboxy (acyl chloride)-functional, particles of graded rubber with hydroxyl groups of about 0.25 to about 1 molar part of a hydroxy and carboxy-functional copolymer of monovinyl monomers and reacting the acid groups of the resultant polymeric product with an epoxy acrylate or epoxy methacrylate monomer, said copolymer of vinyl monomers being hydroxy-functional as the result of polymerization of about 3 percent to about 7 mole percent of a hydroxyalkyl acrylate or a hydroxy alkyl methacrylate as constituent monomers thereof and carboxy-functional as the result of the polymerization of an ethylenically unsaturated monocarboxylic acid, the concentration of carboxy functionality in said copolymer being such as to provide an average of about 0.7 to about 0.9 unit of alpha-beta olefinic unsaturation per molecule of said copolymer when the carboxy functionally of said copolymer is reacted with said epoxyacrylate or epoxymethacrylate monomer, said particles of graded-rubber consisting essentially of (1) about 10 to about 90 weight percent of a core of crosslinked acrylic polymer consisting essentially of
  (a) a minor and crosslinking amount of a di- or tri-functional monomer containing 2 or more non-conjugated terminal ethylenic groups, said minor and crosslinking amount not exceeding about 20 mole percent of the core reactants, and
  (b) a remainder consisting essentially of a monofunctional monoacrylate, said remainder constituting at a minimum about 80 mole percent of the core reactants, (2) about 90 to about 10 weight percent of an outer shell having glass transition temperature above that of said core and consisting essentially of the polymerization product of monomers selected from the group consisting of
  (a) about 80 to about 98 mole percent methyl methacrylate and about 2 to about 20 mole percent of an alpha-beta olefinically unsaturated monocarboxylic acid, and
  (b) about 2 to about 20 mole percent of an alpha-beta olefinically unsaturated monocarboxylic acid and about 80 to about 98 mole percent of a mixture consisting essentially of esters of acrylic or methacrylic acid and a $C_1$–$C_8$ monohydric alcohol, $C_8$–$C_9$ monovinyl hydrocarbons, 0 to 30 mole percent of a difunctional compound selected from divinyl benzene and diesters of acrylic or methacrylic acid and $C_2$–$C_6$ dihydric alcohol and 0 to 30 mole percent of a monomer selected from acrylonitrile, methacrylonitrile and vinyl acetate, said mixture containing at least 30 mole percent methyl methacrylate.

2. A radiation-curable paint in accordance with claim 1 wherein said epoxyacrylate or epoxymethacrylate monomer is selected from the group consisting of glycidyl acrylate and glycidyl methacrylic, said ethylenically unsaturated monocarboxylic acid is selected from the group consisting of acrylic acid and methacrylic acid, said di- or tri-functional monomer containing 2 or more non-conjugated terminal ethylenic groups is a di- or tri-functional monomer selected from the group consisting of divinyl benzene, diesters of acrylic or methacrylic acid and a $C_2$–$C_8$ dihydric alcohol and triesters of acrylic or methacrylic acid and a $C_2$–$C_8$ trihydric alcohol, said monofunctional monoacrylate is an ester of acrylic acid and a $C_2$–$C_8$ monohydric alcohol, said alpha-beta olefinically unsaturated monocarboxylic acid is selected from acrylic acid and methacrylic acid, said minor and crosslinking amount is about 2 to about 20 mole percent, said remainder is about 80 to about 98 mole percent, and said vinyl monomers are vinyl monomers selected from the group consisting of esters of acrylic acid and a $C_1$–$C_8$ monohydric alcohol, esters of methacrylic acid and a $C_1$–$C_8$ monohydic alcohol, $C_8$–$C_9$ monovinyl hydrocarbons, divinyl benzene, diesters of acrylic acid and a $C_2$–$C_8$ dihydric alcohol and diesters of methacrylic acid and a $C_2$–$C_8$ dihydric alcohol.

3. A radiation-curable paint which on a pigment and particulate filler-free basis comprises a film-forming dispersion of about 20 to about 80 weight percent vinyl monomers consisting essentially of vinyl monomers selected from the group consisting of esters of acrylic acid and a $C_1$–$C_8$ monohydric alcohol, esters of methacrylic acid and a $C_1$–$C_8$ monohydric alcohol, $C_8$–$C_9$ monovinyl hydrocarbons, divinyl benzene, diesters of acrylic acid and a $C_2$–$C_8$ dihydric alcohol, and diesters of methacrylic acid and a $C_2$–$C_8$ dihydric alcohol and about 80 to about 20 weight percent of an alpha-beta olefinically unsaturated rubber-comprising resin formed by esterifying 1 molar part of carboxy (acyl chloride)-functional, particles of graded-rubber with hydroxyl groups of about 0.25 to about 1 molar part of a hydroxy and carboxy-functional copolymer of monovinyl monomers and reacting the resultant polymeric product with an epoxyacrylate or epoxycopolymer of monovinyl monomers and reacting the resultant polymeric product with an epoxyacrylate or epoxymethacrylate monomer, said copolymer of monovinyl monomers being hydroxy-functional as the result of about 3 mole percent to about 7 mole percent of a hydroxyalkyl acrylate selected from the group consisting of hydroxyethyl acrylate, hydroxyethyl methacrylate, hydroxypropyl acrylate and hydroxypropyl methacrylate as constituent monomers thereof and carboxy-functional as the result of the polymerization of an ethylenically unsaturated monocarboxylic acid selected from the group consisting of acrylic acid and methacrylic acid, the concentration of carboxy functionality in said copolymer being such as to provide an average of about 0.7 to about 0.9 unit of alpha-beta olefinic unsaturation per molecule of said copolymer when the carboxy functionality of said copolymer is reacted with said epoxyacrylate or epoxymethacrylate monomer, said epoxyacrylate or epoxymethacrylate being introduced into reaction mixture with said resultant polymeric product in an amount to provide about 0.7 to about 0.99 mole of epoxy groups per mole of carboxyl and carboxy (acyl chloride) groups in said reaction mixture and being reacted with carboxy groups of said copolymer and carboxy (acyl chloride) groups remaining on said graded-rubber particles after esterification of hydroxy groups of molecules of said copolymer with carboxy (acyl chloride) groups on said particles of graded-rubber, said particles of graded-rubber consisting essentially of (1) about 10 to about 90 weight percent of a core of crosslinked acrylic polymer consisting essentially of
   (a) a minor and crosslinking amount of a di- or tri-functional monomer selected from the group consisting of divinyl benzene, diesters of acrylic or methacrylic acid and a $C_2$–$C_8$ dihydric alcohol, and triesters of acrylic or methacrylic acid and a $C_2$–$C_8$ trihydric alcohol, said minor and crosslinking amount not exceeding about 20 mole percent of the core reactants, and
   (b) a remainder consisting essentially of monoesters of acrylic acid and a $C_2$–$C_8$ monohydric alcohol, said remainder constituting at a minimum about 80 mole percent of the core reactants, (2) about 90 to about 10 weight percent of an outer shell having glass transition temperature at least 50° C. about that of said core and consisting essentially of the polymerization product of monomers selected from the group consisting of
   (a) about 80 to about 98 mole percent methyl methacrylate and about 2 to about 20 mole percent of an alpha-beta olefinically unsaturated monocarboxylic acid, and
   (b) about 2 to about 20 mole percent of an alpha-beta olefinically unsaturated monocarboxylic acid and about 80 to about 98 mole percent of a mixture consisting essentially of esters of acrylic or methacrylic acid and a $C_1$–$C_8$ monohydric alcohol, $C_8$–$C_9$ monovinyl hydrocarbons, 0 to 30 mole percent of a difunctional compound selected from divinyl benzene and diesters of acrylic or methacrylic acid and $C_2$–$C_6$ dihydric alcohol and 0 to 30 mole percent of a monomer selected from acrylonitrile, methacrylonitrile and vinyl acetate, said mixture containing at least 30 mole percent methyl methacrylate.

4. A radiation-curable paint in accordance with claim 3 wherein said core is crosslinked acrylic polymer consisting essentially of butyl acrylate and a diacrylate selected from 1,3-butylene diacrylate and 1,3-butylene dimethacrylate.

5. A radiation-curable paint in accordance with claim 3 wherein said core is crosslinked acrylic polymer consisting essentially of 2-ethyl hexyl acrylate and a diacrylate selected from 1,3-butylene diacrylate and 1,3-butylene dimethacrylate.

6. A radiation-curable paint in accordance with claim 3 wherein said graded-rubber particles have average diameter in the range of about 0.04 to about 1 micron.

7. A radiation-curable paint in accordance with claim 3 wherein said minor and crosslinking amount is about 2 to about 20 mole percent and said remainder is about 80 to about 98 mole percent.

8. The method of coating a substrate which comprises:
(A) applying to a surface of said substrate a film of radiation-curable paint which on a pigment and particulate filler-free basis comprises a film-forming dispersion of about 20 to 80 weight percent of an alpha-beta olefinically unsaturated, rubber-comprising resin formed by esterifying 1 molar part of carboxy (acyl chloride)-functional, particles of graded rubber with hydroxyl groups of about 0.25 to about 1 molar part of a hydroxy and carboxy-functional copolymer of monovinyl monomers and reacting the acid groups of the resultant polymeric product with an epoxyacrylate or epoxymethacrylate monomer, said copolymer of vinyl monomers being hydroxy-functional as the result of polymerization of about 3 percent to about 7 mole percent of a hydroxyalkyl acrylate or a hydroxy alkyl methacrylate as constituent monomers thereof and carboxy-functional as the result of the polymerization of an ethylenically unsaturated monocarboxylic acid, the concentration of carboxy functionality in said copolymer being such as to provide an average of about 0.7 to about 0.9 unit of alpha-beta olefinic unsaturation per molecule of said copolymer when the carboxy functionality of said copolymer is reacted with said epoxy acrylate or epoxymethacrylate monomer, said particles of graded-rubber consisting essentially of (1) about 10 to about 90 weight percent of a core of crosslinked acrylic polymer consisting essentially of
  (a) a minor and crosslinking amount of a di- or tri-functional monomer containing 2 or more non-conjugated terminal ethylenic groups, said minor and crosslinking amount not exceeding about 20 mole percent of the core reactants, and
  (b) a remainder consisting essentially of a monofunctional monoacrylate, said remainder constituting at a minimum about 80 mole percent of the core reactants,
(2) about 90 to about 10 weight percent of an outer shell having glass transition temperature above that of said core and consisting essentially of the polymerization product of monomers selected from the group consisting of
  (a) about 80 to about 98 mole percent methyl methacrylate and about 2 to about 20 mole percent of an alpha-beta olefinically unsaturated monocarboxylic acid, and
  (b) about 2 to about 20 mole percent of an alpha-beta olefinically unsaturated monocarboxylic acid and about 80 to about 98 mole percent of a mixture consisting essentially of esters of acrylic or methacrylic acid and a $C_1$–$C_8$ monohydric alcohol, $C_8$–$C_9$ monovinyl hydrocarbons, 0 to 30 mole percent of a difunctional compound selected from divinyl benzene and diesters of acrylic or methacrylic acid and $C_2$–$C_6$ dihydric alcohol and 0 to 30 mole percent of a monomer selected from acrylonitrile, methacrylonitrile and vinyl acetate, said mixture containing at least 30 mole percent methyl methacrylate, and (B) crosslinking said film upon said substrate by exposing said film to a beam of electrons having average energy in the range of about 100,000 to about 500,000 electron volts.

9. A method of coating in accordance with claim 8 wherein said epoxyacrylate or epoxymethacrylate monomer is selected from the group consisting of glycidyl acrylate and glycidyl methacrylate, said ethylenically unsaturated monocarboxylic acid is selected from the group consisting of acrylic acid and methacrylic acid, said di- or tri-functional monomer containing 2 or more non-conjugated terminal ethylenic groups is a di- or tri-functional monomer selected from the group consisting of divinyl benzene, diesters of acrylic or methacrylic acid and a $C_2$–$C_8$ dihydric alcohol and triesters of acrylic or methacrylic acid and a $C_2$–$C_8$ trihydric alcohol, said monofunctional monoacrylate is an ester of acrylic acid and a $C_2$–$C_8$ monohydric alcohol, said alpha-beta olefinically unsaturated monocarboxylic acid is selected from acrylic acid and methacrylic acid, said minor and crosslinking amount is about 2 to about 20 mole percent, said remainder is about 80 to about 98 mole percent, and said vinyl monomers are vinyl monomers selected from the group consisting of esters of acrylic acid and a $C_1$–$C_8$ monohydric alcohol, esters of methacrylic acid and a $C_1$–$C_8$ monohydric alcohol, $C_8$–$C_9$ monovinyl hydrocarbons, divinyl benzene, diesters of acrylic acid and a $C_2$–$C_8$ dihydric alcohol and diesters of methacrylic acid and $C_2$–$C_8$ dihydric alcohol.

10. The method of coating a substrate which comprises:
(A) applying to a surface of said substrate a film of radiation-curable paint which on a pigment and particulate filler-free basis comprises a film-forming dispersion of about 20 to about 80 weight percent vinyl monomers consisting essentially of vinyl monomers selected from the group consisting of esters of acrylic acid and a $C_1$–$C_8$ monohydric alcohol, esters of methacrylic acid and a $C_1$–$C_8$ monohydric alcohol, $C_8$–$C_9$ monovinyl hydrocarbons, divinyl benzene, diesters of acrylic acid and a $C_2$–$C_8$ dihydric alcohol, and diesters of methacrylic acid and a $C_2$–$C_8$ dihydric alcohol and about 80 to about 20 weight percent of an alpha-beta olefinically unsaturated, rubber-comprising resin formed by esterifying 1 molar part of carboxy (acyl chloride)-functional, particles of graded-rubber with hydroxyl groups of about 0.25 to about 1 molar part of a hydroxy and carboxy-functional copolymer of monovinyl monomers and reacting the resultant polymeric product with an epoxyacrylate or epoxymethacrylate monomer, said copolymer of monovinyl monomers being hydroxy-functional as the result of about 3 mole percent to about 7 mole percent of a hydroxyalkyl acrylate selected from the group consisting of hydroxyethyl acrylate, hydroxyethyl methacrylate, hydroxypropyl acrylate and hydroxypropyl methacrylate as constituent monomers thereof and carboxy-functional as the result of the polymerization of an ethylenically unsaturated monocarboxylic acid selected from the group consisting of acrylic acid and methacrylic acid, the concentration of carboxy functionality in said copolymer being such as to provide an average of about 0.7 to about 0.9 unit of alpha-beta olefinic unsaturation per molecule of said copolymer when the carboxy functionality of said copolymer is reacted with said epoxyacrylate or epoxymethacrylate monomer, said epoxyacrylate or epoxymethacrylate being introduced into reaction mixture with said resultant polymeric product in an amount to provide about 0.7 to about 0.99 mole of epoxy groups per mole of carboxyl and carboxy (acyl chloride) groups in said reaction mixture and being reacted with carboxy groups of said copolymer and carboxy (acyl chloride) groups remaining on said graded-rubber particles after esterification of hydroxyl groups of molecules of said copolymer with carboxy (acyl chloride) groups on said particles of graded-rubber, said particles of graded-rubber consisting essentially of (1) about 10 to about 90 weight percent of a core of crosslinked acrylic polymer consisting essentially of
  (a) a minor and crosslinking amount of a di- or tri-functional monomer selected from the group consisting of divinyl benzene, diesters of acrylic or methacrylic acid and a $C_2$–$C_8$ dihydric alcohol, and triesters of acrylic or methacrylic acid and a $C_2$–$C_8$ trihydric alcohol, said minor and crosslinking amount not exceeding about 20 mole percent of the core reactants, and
  (b) a remainder consisting essentially of monoesters of acrylic acid and a $C_2$–$C_8$ monohydric alcohol, said remainder constituting at a minimum about 80 mole percent of the core reactants,
(2) about 90 to about 10 weight percent of an outer shell having glass transition temperature at least 50° C. above that of said core and consisting essentially of the polymerization product of monomers selected from the group consisting of
  (a) about 80 to about 98 mole percent methyl methacrylate and about 2 to about 20 mole percent of an alpha-beta olefinically unsaturated monocarboxylic acid, and (b) about 2 to about 20 mole percent of an alpha-beta olefinically unsaturated monocarboxylic acid and about 80 to about 98 mole percent of a mixture consisting essentially of esters of acrylic or methacrylic acid and a $C_1$–$C_8$ monohydric alcohol, $C_8$–$C_9$ monovinyl hydrocarbons, 0 to 30 mole percent of a difunctional compound selected from divinyl benzene and diesters of acrylic or methacrylic acid and $C_2$–$C_6$ dihydric alcohol and 0 to 30 mole percent of a monomer selected from acrylonitrile, methacrylonitrile and vinyl acetate, said mixture containing at least 30 mole percent methyl methacrylate, and (B) crosslinking said film upon said substrate by exposing said film to a beam of electrons having average energy in the range of about 100,000 to about 500,000 electron volts.

11. A radiation-curable paint in accordance with claim 10 wherein said core is crosslinked acrylic polymer consisting essentially of butyl acrylate and a diacrylate selected from 1,3-butylene diacrylate and 1,3-butylene dimethacrylate.

12. A radiation-curable paint in accordance with claim 10 wherein said core is crosslinked acrylic polymer consisting essentially of 2-ethyl hexyl acrylate and a diacrylate selected from 1,3-butylene diacrylate and 1,3-butylene dimethacrylate.

13. A radiation-curable paint in accordance with claim 10 wherein said graded-rubber particles have average diameter in the range of about 0.04 to about 1 micron.

14. A radiation-curable paint in accordance with claim 10 wherein said minor and crosslinking amount is about 2 to about 20 mole percent and said remainder is about 80 to about 98 mole percent.

15. An article of manufacture comprising in combination a substrate and a coating thereon comprising the polymerization product of a film-forming dispersion crosslinked in situ by ionizing radiation, said film-forming dispersion on a pigment and particulate filler-free basis consisting essentially of about 20 to about 80 weight percent of an alpha-beta olefinically unsaturated, rubber-comprising resin formed by esterifying 1 molar part of carboxy (acyl chloride)-functional, particles of graded rubber with hydroxyl groups of about 0.25 to about 1 molar part of a hydroxy and carboxy-functional copolymer of monovinyl monomers and reacting the acid groups of the resultant polymeric product with an epoxyacrylate or epoxymethacrylate monomer, said copolymer of vinyl monomers being hydroxy-functional as the result of polymerization of about 3 percent to about 7 mole percent of a hydroxyalkyl acrylate or a hydroxy alkyl methacrylate as constituent monomers thereof and carboxy-functional as the result of the polymerization of an ethylenically unsaturated monocarboxylic acid, the concentration of carboxy functionality in said copolymer being such as to provide an average of about 0.7 to about 0.9 unit of alpha-beta olefinic unsaturation per molecule of said copolymer when the carboxy functionality of said copolymer is reacted with said epoxyacrylate or epoxymethacrylate monomer, said particles of graded-rubber consisting essentially of (1) about 10 to about 90 weight percent of a core of crosslinked acrylic polymer consisting essentially of (a) a minor and crosslinking amount of a di- or tri-functional monomer containing 2 or more non-conjugated terminal ethylenic groups, said minor and crosslinking amount not exceeding about 20 mole percent of the core reactants, and (b) a remainder consisting essentially of a monofunctional monoacrylate, said remainder constituting at a minimum about 80 mole percent of the core reactants, (2) about 90 to about 10 weight percent of an outer shell having glass transition temperature above that of said core and consisting essentially of the polymerization product or monomers selected from the group consisting of (a) about 80 to about 98 mole percent methyl methacrylate and about 2 to about 20 mole percent of an alpha-beta olefinically unsaturated monocarboxylic acid, and (b) about 2 to about 20 mole percent of an alpha-beta olefinically unsaturated monocarboxylic acid and about 80 to about 98 mole percent of a mixture consisting essentially of esters of acrylic or methacrylic acid and a $C_1$–$C_8$ monohydric alcohol, $C_8$–$C_9$ monovinyl hydrocarbons, 0 to 30 mole percent of a difunctional compound selected from divinyl benzene and diesters of acrylic or methacrylic acid and $C_2$–$C_6$ dihydric alcohol and 0 to 30 mole percent of a monomer selected from acrylonitrile, methacrylonitrile and vinyl acetate, said mixture containing at least 30 mole percent methyl methacrylate.

16. An article of manufacture in accordance with claim 15 wherein said epoxyacrylate or epoxymethacrylate monomer is selected from the group consisting of glycidyl acrylate and glycidyl methacrylate, said ethylenically unsaturated monocarboxylic acid is selected from the group consisting of acrylic acid and methacrylic acid, said di- or tri-functional monomer containing 2 or more non-conjugated terminal ethylenic groups is a di- or tri-functional monomer selected from the group consisting of divinyl benzene, diesters of acrylic or methacrylic acid and a $C_2$–$C_8$ dihydric alcohol and triesters of acrylic or methacrylic acid and a $C_2$–$C_8$ trihydric alcohol, said monofunctional monoacrylate is an ester of acrylic acid and a $C_2$–$C_8$ monohydric alcohol, said alpha-beta olefinically unsaturated monocarboxylic acid is selected from acrylic acid and methacrylic acid, said minor and crosslinking amount is about 2 to about 20 mole percent, said remainder is about 80 to about 98 mole percent, and said vinyl monomers are vinyl monomers selected from the group consisting of esters of acrylic acid and a $C_1$–$C_8$ monohydric alcohol, esters of methacrylic acid and a $C_1$–$C_8$ monohydric alcohol, $C_8$–$C_9$ monovinyl hydrocarbons, divinyl benzene, diesters of acrylic acid and a $C_2$–$C_8$ dihydric alcohol and diesters of methacrylic acid and a $C_2$–$C_8$ dihydric alcohol.

17. An article of manufacture comprising in combination a substrate and a coating thereon comprising the polymerization product of a film-forming dispersion crosslinked in situ by ionizing radiation, said film-forming dispersion on a pigment and particulate filler-free basis consisting essentially of about 20 to about 80 weight percent vinyl monomers consisting essentially of vinyl monomers selected from the group consisting of esters of acrylic acid and a $C_1$–$C_8$ monohydric alcohol, esters of methacrylic acid and a $C_1$–$C_8$ monohydric alcohol, $C_8$–$C_9$ monovinyl hydrocarbons, divinyl benzene, diesters of acrylic acid and a $C_2$–$C_8$ dihydric alcohol, and diesters of methacrylic acid and a $C_2$–$C_8$ dihydric alcohol and about 80 to about 20 weight percent of an alpha-beta olefinically unsaturated, rubber-comprising resin formed by esterifying 1 molar part of carboxy (acyl chloride)-functional, particles of graded-rubber with hydroxyl groups of about 0.25 to about 1 molar part of a hydroxy and carboxy-functional copolymer of monovinyl monomers and reacting the resultant polymeric product with an epoxyacrylate or epoxymethacrylate monomer, said copolymer of monovinyl monomers being hydroxy-functional as the result of about 3 mole percent to about 7 mole percent of a hydroxyalkyl acrylate selected from the group consisting of hydroxyethyl acrylate, hydroxyethyl methacrylate, hydroxypropyl acrylate and hydroxypropyl methacrylate as consituent monomers thereof and carboxy-functional as the result of the polymerization of an ethylenically unsaturated monocarboxylic acid selected from the group consisting of acrylic acid and methacrylic acid, the concentration of carboxy functionality in said copolymer being such as to provide an average of about 0.7 to about 0.9 unit of alpha-beta olefinic unsaturation per molecule of said copolymer when the carboxy functionality of said copolymer is reacted with said epoxyacrylate or epoxymethacrylate monomer, said epoxyacrylate or epoxymethacrylate being introduced into reaction mixture with said resultant polymeric product in an amount to provide about 0.7 to about 0.99 mole of epoxy groups per mole of carboxyl and carboxy (acyl chloride) groups in said reaction mixture and being reacted with carboxy groups of said copolymer and carboxy (acyl chloride) groups remaining on said graded-rubber particles after esterification of hydroxyl groups of molecules of said copolymer with carboxy (acyl chloride) groups on said particles of graded-rubber, said particles of graded-rubber consisting essentially of (1) about 10 to about 90 weight percent of a core of crosslinked acrylic polymer consisting essentially of
  (a) a minor and crosslinking amount of a di- or tri-functional monomer selected from the group consisting of divinyl benzene, diesters of acrylic or methacrylic acid and a $C_2$–$C_8$ dihydric alcohol, and triesters of acrylic or methacrylic acid and a $C_2$–$C_8$ trihydric alcohol, said minor and crosslinking amount not exceeding about 20 mole percent of the core reactants, and
  (b) a remainder consisting essentially of monoesters of acrylic acid and a $C_2$–$C_8$ monohydric alcohol, said remainder constituting at a minimum about 80 mole percent of the core reactants, (2) about 90 to about 10 weight percent of an outer shell having glass transition temperature at least 50° C. above that of said core and consisting essentially of the polymerization product of monomers selected from the group consisting of
  (a) about 80 to about 98 mole percent methyl methacrylate and about 2 to about 20 mole percent of an alpha-beta olefinically unsaturated monocarboxylic acid, and
  (b) about 2 to about 20 mole percent of an alpha-beta olefinically unsaturated monocarboxylic acid and about 80 to about 98 mole percent of a mixture consisting essentially of esters of acrylic or methacrylic acid and a $C_1$–$C_8$ monohydric alcohol, $C_8$–$C_9$ monovinyl hydrocarbons, 0 to 30 mole percent of a difunctional compound selected from divinyl benzene and diesters of acrylic or methacrylic acid and $C_2$–$C_6$ dihydric alcohol and 0 to 30 mole percent of a monomer selected from acrylonitrile, methacrylonitrile and vinyl acetate, said mixture containing at least 30 mole percent methyl methacrylate.

References Cited

UNITED STATES PATENTS

| | | | |
|---|---|---|---|
| 3,423,481 | 1/1969 | Mizutani | 260—836 |
| 3,437,514 | 4/1969 | Burlant | 117—93.31 |
| 3,450,796 | 6/1969 | Griffin | 260—885 |
| 3,502,745 | 3/1970 | Minton | 260—881 |
| 3,528,844 | 9/1970 | Burlant | 260—885 |

PAUL LIEBERMAN, Primary Examiner

U.S. Cl. X.R.

260—836, 881, 885